(12) United States Patent
Hua

(10) Patent No.: US 7,116,563 B2
(45) Date of Patent: Oct. 3, 2006

(54) DUAL MODE OVER-CURRENT PROTECTION FOR SWITCHING MODE POWER CONVERTER

(75) Inventor: Lei Hua, Camarillo, CA (US)

(73) Assignee: Semtech Corporation, Camarillo, CA (US)

( * ) Notice: Subject to any disclaimer, the term of this patent is extended or adjusted under 35 U.S.C. 154(b) by 0 days.

(21) Appl. No.: 11/133,902

(22) Filed: May 19, 2005

(65) Prior Publication Data

US 2006/0007714 A1 Jan. 12, 2006

Related U.S. Application Data

(60) Provisional application No. 60/572,981, filed on May 19, 2004.

(51) Int. Cl.
*H02M 3/335* (2006.01)

(52) U.S. Cl. ............... 363/21.06; 363/21.1; 363/21.09

(58) Field of Classification Search ............ 363/21.04, 363/21.06, 21.1, 21.09
See application file for complete search history.

(56) References Cited

U.S. PATENT DOCUMENTS

| | | | | |
|---|---|---|---|---|
| 5,396,412 A | * | 3/1995 | Barlage | 363/89 |
| 5,726,869 A | * | 3/1998 | Yamashita et al. | 363/21.06 |
| 5,841,641 A | * | 11/1998 | Faulk | 363/21.14 |
| 6,249,444 B1 | * | 6/2001 | Cross | 363/21.03 |
| 6,381,152 B1 | * | 4/2002 | Takahashi et al. | 363/21.06 |
| 6,496,395 B1 | * | 12/2002 | Tokunaga et al. | 363/97 |
| 6,778,412 B1 | * | 8/2004 | Nagai et al. | 363/53 |
| 6,791,851 B1 | * | 9/2004 | Brkovic | 363/56.03 |
| 6,845,018 B1 | * | 1/2005 | Ohishi | 363/21.06 |
| 6,961,256 B1 | * | 11/2005 | Yang | 363/127 |

* cited by examiner

*Primary Examiner*—Bao Q. Vu
(74) *Attorney, Agent, or Firm*—O'Melveny & Myers LLP

(57) ABSTRACT

A control circuit for a switched mode power converter is adapted to receive a current sense signal reflecting the output current of the power converter and a feedback signal reflecting the output voltage of the power converter. The control circuit includes a first over-current protection circuit adapted to shut off operation of the switched mode power converter if a sum of the current sense signal and the feedback signal exceed a first predetermined limit, and a second over-current protection circuit adapted to regulate operation of said primary side power switch responsive a comparison of the sum of the current sense signal and the feedback signal to a second predetermined limit. The second predetermined limit is less than the first predetermined limit.

14 Claims, 2 Drawing Sheets

DUAL MODE OVER-CURRENT PROTECTION FOR SWITCHING MODE POWER CONVERTER

RELATED APPLICATION DATA

This application claims priority pursuant to 35 U.S.C. § 119(e) to provisional patent application Ser. No. 60/572,981, filed May 19, 2004.

BACKGROUND OF THE INVENTION

1. Field of the Invention

The present invention relates to switching mode power converter circuits. More particularly, the invention relates to dual mode over-current protection circuit for a switching mode power converter that provides cycle-by-cycle mode over-current control during normal operating conditions and hiccup mode over-current control during short circuit or over-load operating conditions.

2. Description of Related Art

Switching mode DC-to-DC power converters are commonly used in the electronics industry to convert an available direct current (DC) level voltage to another DC level voltage. A switching mode converter provides a regulated DC output voltage to a load by selectively storing energy in an output inductor coupled to the load by switching the flow of current into the output inductor. An isolated forward converter is a particular type of switching mode converter in which an input DC voltage is periodically switched across the primary side of a transformer using one or more power switches, typically provided by MOSFET devices. The transformer provides isolation between the voltage source on the primary side and a load on the secondary side. Two diodes on the secondary side rectify the switched and isolated input voltage, including a forward diode connected in series with secondary winding that conducts current to the load when the input voltage is present across the secondary winding and a free-wheeling diode connected in shunt with the secondary winding that conducts current to the load when the input voltage is not present across the secondary winding.

In order to improve the efficiency of the forward converter circuits, it is known to replace the rectifying diodes with power switches (e.g., MOSFET devices). The operation of the power switches may be controlled so that they are turned on and off in synchronism with the switched input voltage. The control signals applied to the power switches must be synchronized as closely as possible to the current inflection points of the output inductor. This synchronous rectification provides higher efficiency over the foregoing forward converter configuration since the forward voltage drop of the power switches is much lower than that of diodes.

It is known to provide switching mode power converters with specialized circuits that protect against over-current conditions. An over-current condition occurs when the output current delivered to a load exceeds a predetermined limit. The over-current condition can damage the power converter and/or the load. The protection circuits detect an over-current condition and take corrective action to reduce the output current. A first type of current control circuit provides cycle-by-cycle protection by holding the power switch on the primary side in an off state temporarily when the sensed output current reaches an over-current voltage reference. Notably, the power converter is not turned off when the over-current condition is detected. Instead, by keeping the primary side power switch in an off state, the output current will decrease to an acceptable level, whereupon the power converter resumes ordinary operation by periodically activating the primary side power switch. This type of cycle-by-cycle mode current control is advantageous for conditions in which the over-current condition is transient and not particularly severe.

A second type of current control circuit provides hiccup protection by shutting off the power converter entirely when the sensed current signal reaches an over-current limit threshold. This type of hiccup mode current control is advantageous for conditions in which the over-current condition is sustained and presents a significant risk of damage to the power converter and/or load. A drawback of this second type of current control circuit is that it may activate a complete shut down of the power converter at times when the over-current condition is not actually that severe. For example, during a start-up process of a power system in which two or more power converters are operating in parallel, an imbalanced load sharing condition may cause the power converters to become stuck in a cycle of alternatingly activating the hiccup mode current control.

Accordingly, it would be desirable to provide an over-current protection circuit for a switching mode power converter that has the benefits of both cycle-by-cycle and hiccup mode current control.

SUMMARY OF THE INVENTION

The present invention provides a switched mode power converter having a current control circuit that overcomes the drawbacks of the prior art.

The switched mode power converter comprises a transformer having a primary winding and a secondary winding, a primary side power switch coupled to the primary winding and adapted to periodically apply an input voltage to the primary winding, an output filter operatively coupled to the secondary winding to provide an output voltage and output current, a forward synchronous rectification device operatively coupled in series between the secondary winding and the output filter, and a free-wheeling synchronous rectification device operatively coupled in shunt with the secondary winding and the output filter. Current control of the power converter is provided in a cycle-by-cycle mode during normal working state or during start-up or light overload conditions, and hiccup mode current protection is provided during short-circuit or heavily overloaded conditions.

In an embodiment of the invention, a control circuit is adapted to receive a current sense signal reflecting the output current and a feedback signal reflecting the output voltage. The control circuit includes a first over-current protection circuit adapted to shut off operation of the switched mode power converter if a sum of the current sense signal and the feedback signal exceed a first predetermined limit, and a second over-current protection circuit adapted to regulate operation of said primary side power switch responsive a comparison of the sum of the current sense signal and the feedback signal to a second predetermined limit. The second predetermined limit is less than the first predetermined limit.

More particularly, the control circuit further comprises a soft start circuit operatively coupled to the second-over current protection circuit. The soft start circuit holds the second predetermined limit at a constant level during a starting condition of the switched mode power converter. The second over-current protection circuit further comprises a shunt regulator adapted to increase a level of the second predetermined limit upon a short circuit condition of the switched mode power converter. The first over-current protection circuit further comprises a first comparator having a first input receiving the sum of the current sense signal and the feedback signal and a second input receiving a reference defining the first predetermined limit. The second over-current protection circuit further comprises a second comparator having a first input receiving the sum of the current sense signal and the feedback signal and a second input receiving a variable reference defining the second predetermined limit. The variable reference may be provided by a voltage divider circuit and a shunt regulator adapted to vary a voltage defined by the voltage divider circuit. The second over-current protection circuit may further comprise a third comparator having a first input receiving the feedback signal and a second input receiving a threshold reference.

A more complete understanding of the switched mode power converter having a current control circuit will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

The present invention satisfies the need for an over-current protection circuit for a switching mode power converter that has the benefits of both cycle-by-cycle and hiccup mode current control. More particularly, current control of the power converter is provided in a cycle-by-cycle mode during normal working state or during start-up or light overload conditions, and hiccup mode current protection is provided during short-circuit or heavily overloaded conditions. In the detailed description that follows, like element numerals are used to describe like elements illustrated in one or more of the figures.

Figure 1:
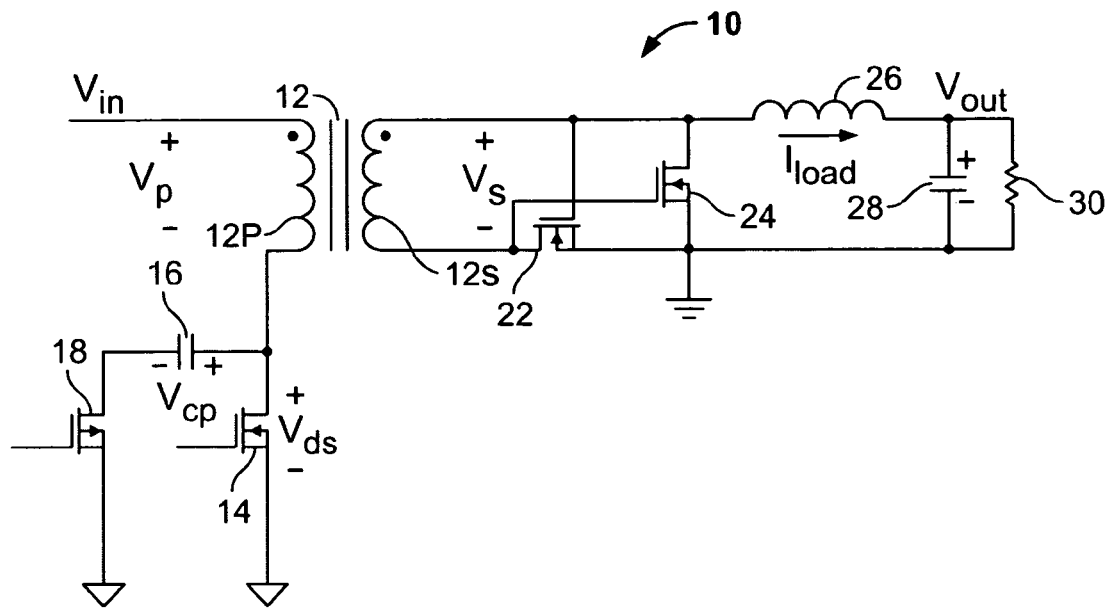
FIG. 1 is a schematic diagram of a prior art isolated forward converter having self-driven synchronous rectification.

Referring first to FIG. 1, a prior art isolated, self-driven forward converter is shown. The forward converter includes a transformer 12 having a primary winding $12_P$ and a secondary winding $12_S$. The dot end of the primary winding $12_P$ is coupled to an input voltage source $V_{IN}$ and the other end of the primary winding is coupled to ground through power switch 14. More particularly, power switch 14 comprises a MOSFET device having drain terminal coupled to the primary winding $12_P$, source terminal coupled to ground, and gate terminal coupled to a pulse width modulator (PWM) (not shown). A second power switch 18 is coupled in parallel with power switch 14 and a reset capacitor 16 is connected between the drain terminals of power switches 14 and 18. The PWM provides periodic activation signals to the power switch 14 to regulate the power delivered to the primary winding $12_P$ of the transformer 12. During off states of the power switch 14, the reset capacitor 16 is charged as current is dumped from the primary winding $12_P$, thereby resetting the transformer 12 for the next cycle. Second power switch 18 is then activated to discharge the reset capacitor 16.

The secondary side of the forward converter includes a forward synchronous rectifier 22 connected in series with the secondary winding $12_S$ and a free-wheeling synchronous rectifier 24 connected in shunt with the secondary winding. An output inductor 26 is coupled in series with the secondary winding $12_S$. The output inductor 26 is further coupled to an output terminal, with a capacitor 28 coupled between the output terminal and ground. The output inductor 26 and capacitor 28 define a filter that provides a smoothed DC output voltage $V_{OUT}$ at the output terminal relative to ground. During operation, a load 30 is coupled to the output terminal. The gate terminal of forward synchronous rectifier 22 is coupled to the dot end of the secondary winding $12_S$ and the gate terminal of free-wheeling synchronous rectifier 24 is coupled to the other end of the secondary winding $12_S$.

When power switch 14 is turned on, the dot ends of the primary and secondary windings $12_P$, $12_S$ go positive with respect to the non-dot ends. Current and power flows into the dot end of the primary winding $12_P$. Forward synchronous rectifier 22 is turned on and current and power flow out of the dot end of the secondary winding $12_S$ and into the output inductor 26. Current in the output inductor 26 flows through the load 30, partly through the capacitor 28, and back into the secondary winding $12_S$ through forward synchronous rectifier 22. Conversely, when power switch 14 is turned off, current stored in the magnetizing inductance of transformer 12 is dumped into the reset capacitor 16, which reverses the polarity of the voltage across primary winding $12_P$. This causes the dot ends of primary and secondary windings $12_P$, $12_S$ to go negative with respect to the non-dot ends, causing the forward synchronous rectifier 22 to be shut off and the free-wheeling synchronous rectifier 24 to be turned on. Current in the output inductor 26 continues to flow in the same direction through the load 30, partly through the capacitor 28, and up through the free-wheeling synchronous rectifier 24 back into the output inductor 26. The process then repeats.

As noted above, secondary side synchronous rectification is widely adopted in isolated power converter topologies because of its high efficiency. Because of the synchronous rectification, under zero load condition, current $I_{load}$ in the output inductor 26 would always be continuous. Thus, at the beginning of each cycle, under zero load condition, the current flowing through the primary side power switch 14 would be from the source to the drain, which would be negative if it is assumed that the positive direction is flowing from the drain to the source.

In typical current mode control, the output current signal $I_{load}$ is sensed and provided as an input to the PWM. During the zero load condition, the current signal $I_{load}$ may be negative. The conventional PWM integrated circuit typically includes an electrostatic discharge (ESD) protection diode to clamp the negative voltage on each pin to prevent the PWM from being damaged. The negative voltage on the current sensing pin could damage the ESD diode or distort the real current signal, which would cause the PWM to malfunction. One way to overcome this problem is to add the output voltage $V_{out}$ feedback signal together with the current sense signal and then compare the summed signal with a reference. This way, even if the current sense signal is negative, the feedback signal would push it up positive to avoid the problem addressed above. A drawback with this operation is that it precludes hiccup mode over-current protection since the feedback signal and sensed current signal are added together. To achieve hiccup mode over-current protection, the feedback signal needs to be distinguished from the sensed current signal.

Figure 2:
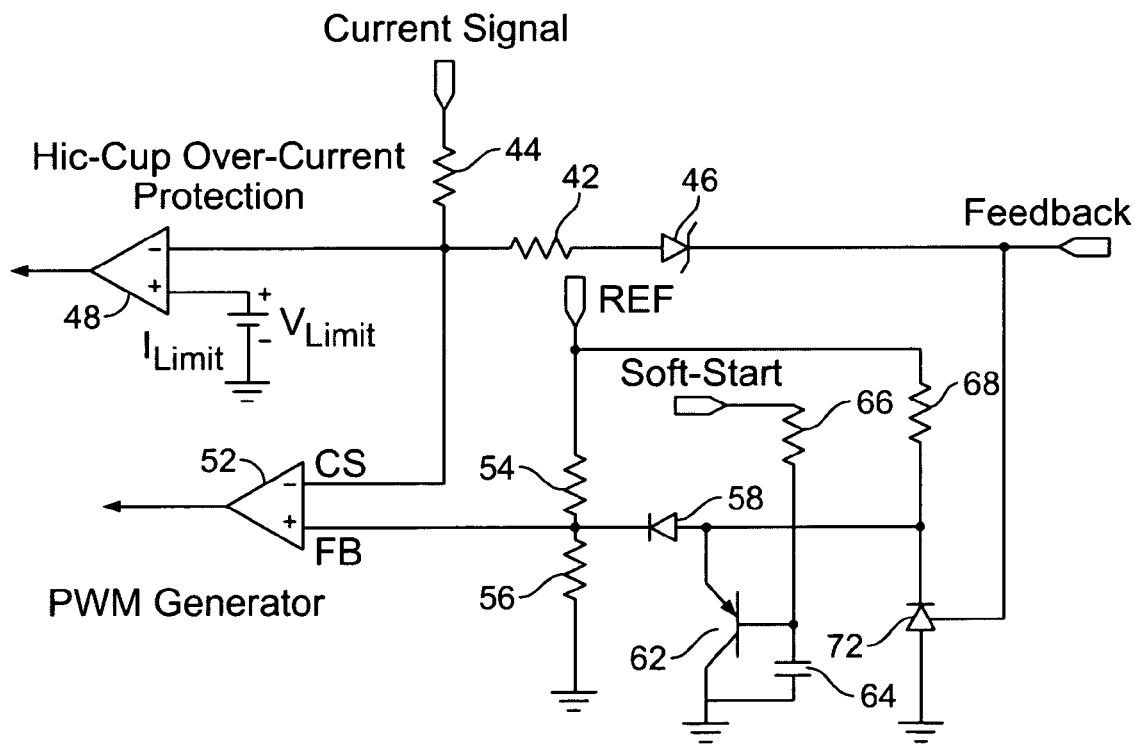
FIG. 2 is a schematic diagram of an over-current protection circuit in accordance with an embodiment of the invention.

As shown in FIG. 2, the feedback signal and the sensed current signal are summed together via resistors 42 and 44, respectively. $V_{Lim}$ is the hiccup over-current protection limit reference voltage. A first comparator 48 compares the summed signal to the reference voltage $V_{Lim}$, and produces a signal causing the PWM to go into hiccup mode if the summed signal is equal to the reference voltage $V_{Lim}$. A second comparator 52 provides the PWM generator, and compares the current sense signal (CS) with the feedback signal (FB). The summed signal is also provided to the CS input of the comparator 52 to generate PWM signals. The reference voltage (REF) divided via resistors 54 and 56 sets the voltage of the FB input of the comparator 52, which is selected to be 200–300 mV less than $V_{Lim}$. The feedback signal controls the voltage at the cathode of shunt regulator 72, which in turn controls the biasing of diode 58 coupled to the non-inverting pin of the comparator 52.

Under normal working conditions, the sensed current signal and the feedback signal are summed via resistors 42 and 44. Since the potential at the FB input of comparator 52 is less than the potential at the cathode of shunt regulator 72, diode 58 is reverse biased. The feedback signal will be biased up to about 3V via zener diode 46 to ensure that the potential at the cathode of shunt regulator 72 is lower than that of the FB input of comparator 52, so that diode 58 is reverse biased. During the soft-start, the potential at the cathode of shunt regulator 72 would be pulled down to ground by the soft-start clamping circuit comprised of transistor 62, capacitor 64 and resistor 66. When an over-current condition happens, the feedback signal basically goes low and the system goes into cycle-by-cycle current limit. When a short circuit happens, the potential at the cathode of shunt regulator 72 will go high and forward bias diode 58. So, the CS signal will be higher than $V_{Lim}$ and the hiccup mode over current protection will be triggered.

Figure 3:
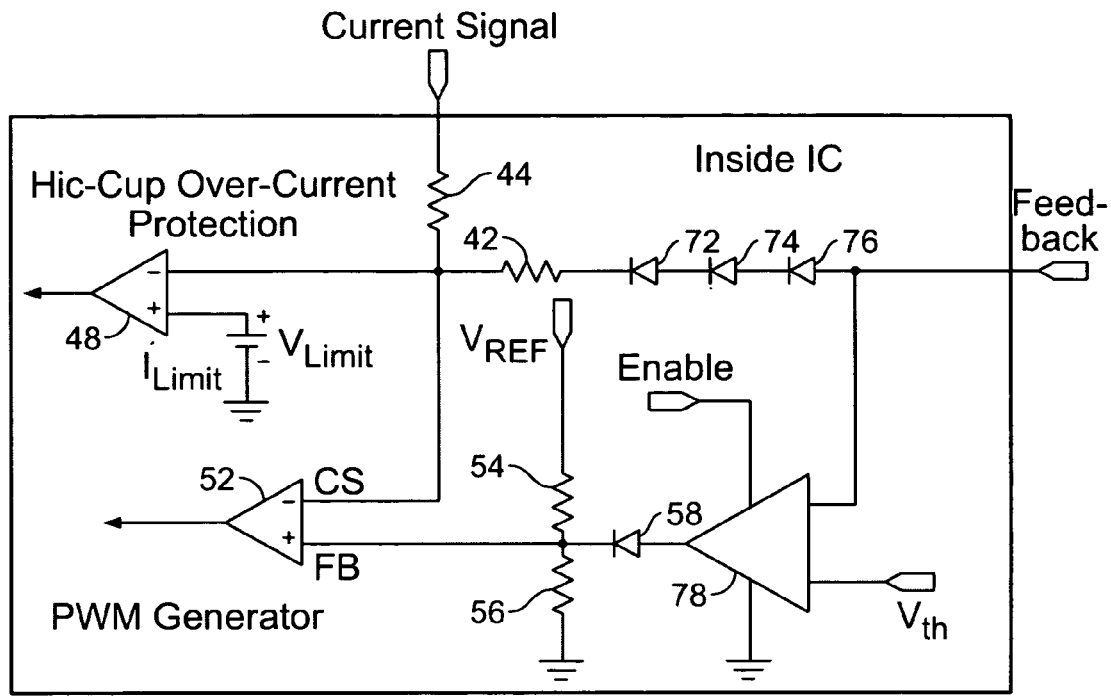
FIG. 3 is a schematic diagram of an over-current protection circuit in accordance with another embodiment of the invention.
Figure 4:
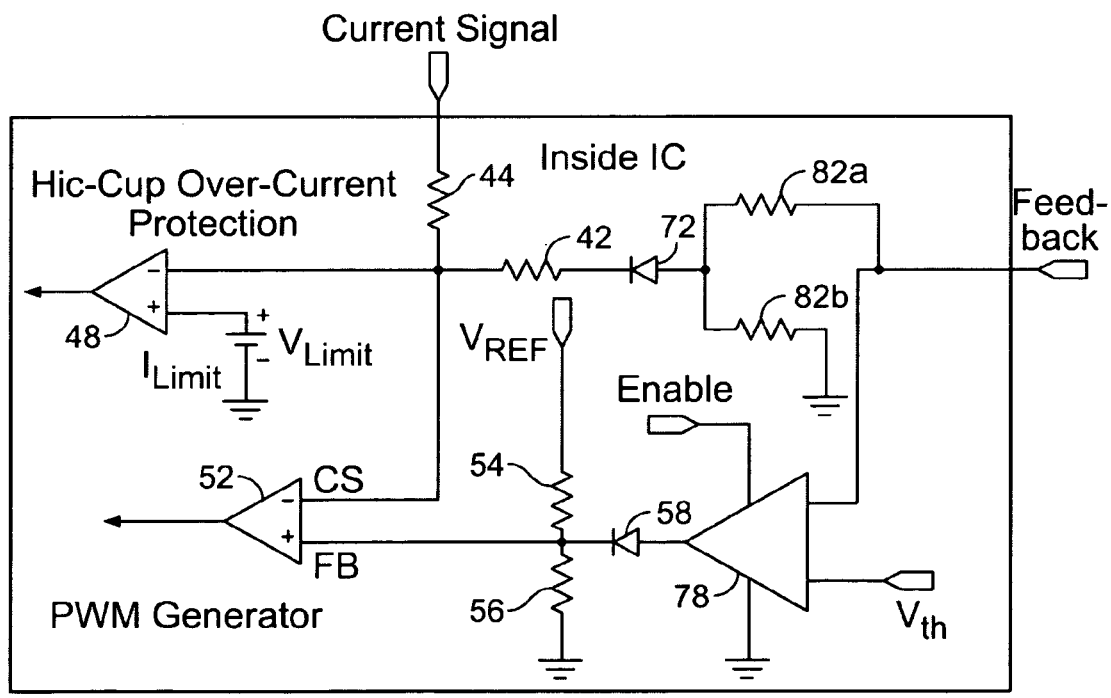
FIG. 4 is a schematic diagram of an over-current protection circuit in accordance with yet another embodiment of the invention.

This control strategy could be implemented through use of discrete circuit components or an integrated circuit. A simplified version of an IC-implemented circuit is illustrated in FIG. 3. Diodes 72, 74 and 76 are used to push up the feedback pin voltage while in normal operation conditions. This increase of the feedback voltage can also be achieved using a voltage divider comprised of two resistors $82_a$ and $82_b$ with a large ratio as shown in FIG. 4. In both FIGS. 3 and 4, the feedback voltage is compared to a threshold voltage $V_{th}$ by a comparator 78. The threshold voltage $V_{th}$ is used to trigger the hiccup mode over-current protection. The enable pin of the comparator 78 will disable the comparator during the start up process so that the hiccup mode over-current protection would not be activated at this time. Most ICs include a diode for protection against electrostatic discharge (ESD), which is also suitable for use as a temperature-sensing device. With the above configuration, a negative current sense signal could be handled without damaging the ESD diode.

Having thus described a preferred embodiment of a dual mode over-current protection circuit for a synchronous rectification topology, it should be apparent to those skilled in the art that certain advantages of the described method and apparatus have been achieved. It should also be appreciated that various modifications, adaptations, and alternative embodiments thereof may be made within the scope and spirit of the present invention. The invention is defined solely by the following claims.

What is claimed is:

1. A switched mode power converter, comprising:
   a transformer having a primary winding and a secondary winding;
   a primary side power switch coupled to said primary winding and being adapted to periodically apply an input voltage to said primary winding;
   an output filter operatively coupled to said secondary winding to provide an output voltage and output current;
   a forward synchronous rectification device operatively coupled in series between said secondary winding and said output filter;
   a free-wheeling synchronous rectification device operatively coupled in shunt with said secondary winding and said output filter; and
   a control circuit adapted to receive a current sense signal reflecting the output current and a feedback signal reflecting the output voltage, the control circuit including a first over-current protection circuit adapted to shut off operation of the switched mode power converter if a sum of the current sense signal and the feedback signal exceed a first predetermined limit, and a second over-current protection circuit adapted to regulate operation of said primary side power switch responsive a comparison of the sum of the current sense signal and the feedback signal to a second predetermined limit, wherein said second predetermined limit is less than the first predetermined limit.

2. The switched mode power converter of claim 1, wherein said control circuit further comprises a soft start circuit operatively coupled to the second-over current protection circuit, the soft start circuit holding the second predetermined limit at a constant level during a starting condition of the switched mode power converter.

3. The switched mode power converter of claim 1, wherein the second over-current protection circuit further comprises a shunt regulator adapted to increase a level of the second predetermined limit upon a short circuit condition of the switched mode power converter.

4. The switched mode power converter of claim 1, wherein the first over-current protection circuit further comprises a first comparator having a first input receiving said sum of the current sense signal and the feedback signal and a second input receiving a reference defining the first predetermined limit.

5. The switched mode power converter of claim 1, wherein the second over-current protection circuit further comprises a second comparator having a first input receiving said sum of the current sense signal and the feedback signal and a second input receiving a variable reference defining the second predetermined limit.

6. The switched mode power converter of claim 5, wherein the variable reference is provided by a voltage divider circuit and a shunt regulator adapted to vary a voltage defined by the voltage divider circuit.

7. The switched mode power converter of claim 5, wherein the second over-current protection circuit further comprises a third comparator having a first input receiving the feedback signal and a second input receiving a threshold reference.

8. In a switched mode power converter comprising a transformer having a primary winding and a secondary winding, a primary side power switch coupled to said primary winding and being adapted to periodically apply an input voltage to said primary winding, an output filter operatively coupled to said secondary winding to provide an output voltage and output current, a forward synchronous rectification device operatively coupled in series between said secondary winding and said output filter, and a free-wheeling synchronous rectification device operatively coupled in shunt with said secondary winding and said output filter, a control circuit comprises:

a first over-current protection circuit adapted to shut off operation of the switched mode power converter if a sum of a current sense signal reflecting the output current and a feedback signal reflecting the output voltage exceed a first predetermined limit; and a second over-current protection circuit adapted to regulate operation of said primary side power switch responsive a comparison of the sum of the current sense signal and the feedback signal to a second predetermined limit, wherein said second predetermined limit is less than the first predetermined limit.

9. The control circuit of claim 8, further comprising a soft start circuit operatively coupled to the second-over current protection circuit, the soft start circuit holding the second predetermined limit at a constant level during a starting condition of the switched mode power converter.

10. The control circuit of claim 8, wherein the second over-current protection circuit further comprises a shunt regulator adapted to increase a level of the second predetermined limit upon a short circuit condition of the switched mode power converter.

11. The control circuit of claim 8, wherein the first over-current protection circuit further comprises a first comparator having a first input receiving said sum of the current sense signal and the feedback signal and a second input receiving a reference defining the first predetermined limit.

12. The control circuit of claim 8, wherein the second over-current protection circuit further comprises a second comparator having a first input receiving said sum of the current sense signal and the feedback signal and a second input receiving a variable reference defining the second predetermined limit.

13. The control circuit of claim 12, wherein the variable reference is provided by a voltage divider circuit and a shunt regulator adapted to vary a voltage defined by the voltage divider circuit.

14. The control circuit of claim 12, wherein the second over-current protection circuit further comprises a third comparator having a first input receiving the feedback signal and a second input receiving a threshold reference.

* * * * *